March 10, 1959  M. A. WOODS  2,876,691
BASEBOARD AIR DUCT ASSEMBLY
Filed June 4, 1957  2 Sheets-Sheet 1
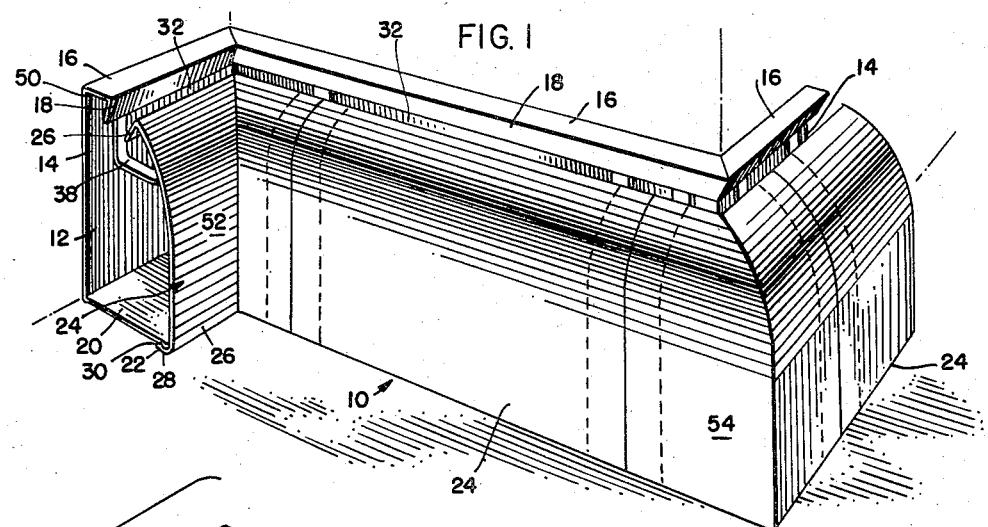
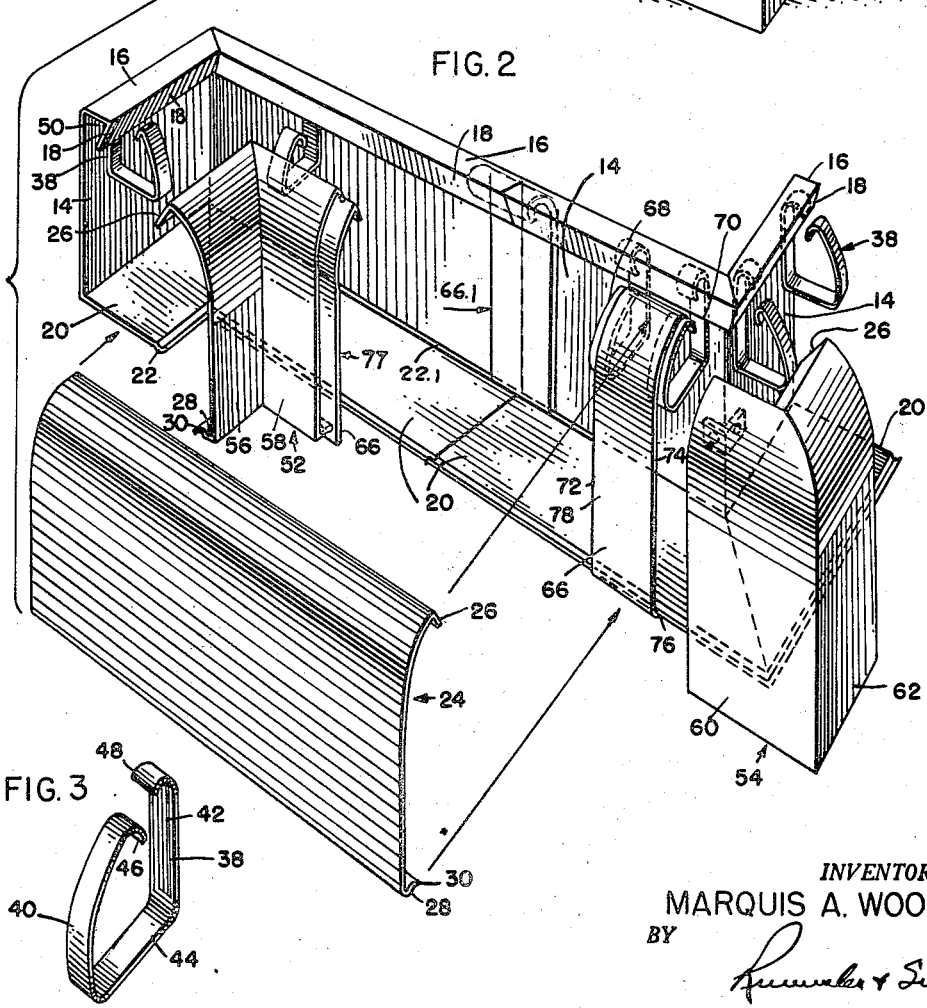
INVENTOR:
MARQUIS A. WOODS
BY
ATT'Y March 10, 1959   M. A. WOODS   2,876,691
BASEBOARD AIR DUCT ASSEMBLY
Filed June 4, 1957   2 Sheets-Sheet 2
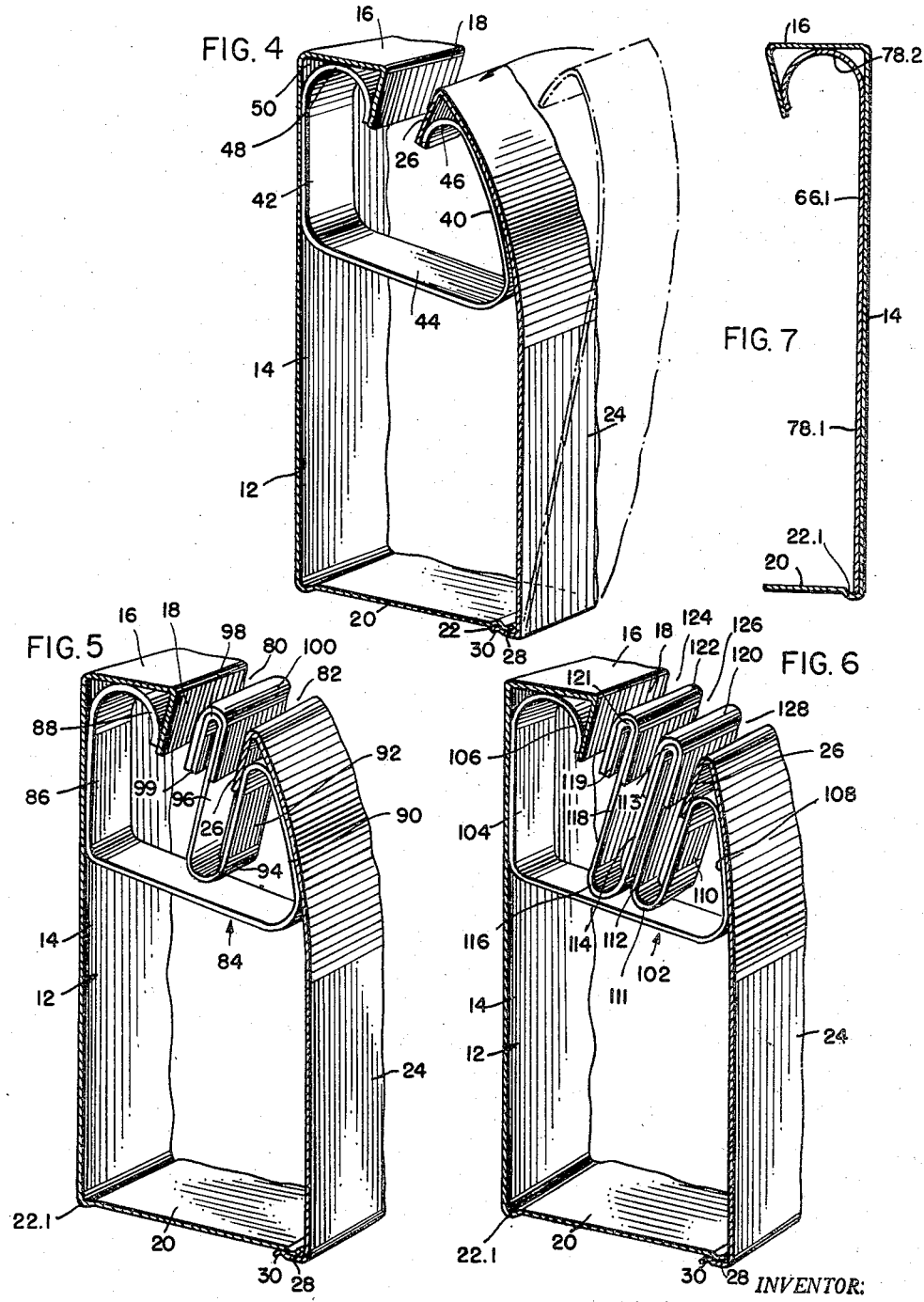
INVENTOR:
MARQUIS A. WOODS
BY
ATT'YS

United States Patent Office 2,876,691
Patented Mar. 10, 1959

2,876,691
BASEBOARD AIR DUCT ASSEMBLY
Marquis A. Woods, Franklin Park, Ill.

Application June 4, 1957, Serial No. 663,436

11 Claims. (Cl. 98—40)

This invention relates to a baseboard air duct assembly having a continuous air discharge slot and more particularly to such an air duct assembly in which a pair of members comprising a sectional conduit are maintained in predetermined spaced-apart and fixed relationship by an improved snap-on clip means retained therebetween.

Heretofore, it has been necessary to assemble these ducts with a back section and a front section which are secured together by means of sheet metal screws, internal brackets, bolts or other means to form a hollow conduit.

Furthermore, it has been necessary to align front and back conduit sections very carefully so that the apertures for receiving the screws or other fastening means will be in proper position. Thus extremely close tolerances have been required in manufacture and the effort, time and expense required in mounting and assembling the ducts have been very great.

For example, these baseboard air conduits or ducts ordinarily come in rather long sections, from 10 to 18 feet in length, and the use of screws and bolts together with internal brackets makes a close fit at the corner sections very difficult to obtain.

Accordingly, it is an object of the present invention to provide an improved spring clip arrangement, for use with individual sections as described, which is adapted to maintain a front section of an air duct in spaced-apart relationship to the back section thereof whereby a continuous air discharge slot along the top of the duct is obtained.

Another object is to provide a baseboard air duct as described wherein the spring clip is a separate unit which may be used at any desired location along the duct, a plurality of such springs being utilized to hold the duct sections in firmly aligned relationship.

Another object of the invention is to provide a construction for the back section and the front section of the duct respectively which is adapted to engage the spring clip in complementary and tightly fitted relationship, the upper portion of the front duct member or section defining the aforementioned continuous slot and being adapted to cam onto the spring clip with a snap-on action.

Another object of the invention is to provide a method of installing the baseboard air duct assembly according to the invention wherein the front section may be progressively cammed onto the individual spring clips, from one end of the section to the other, which are disposed in spaced apart relation in the upper marginal edges of the back sections whereby to secure the front section in fixed spaced relation to the back section.

Another object of the invention is to provide a method of joining the individual sections and an apparatus therefor whereby a duct of any predetermined and desired length, with appropriate internal and external corner members, may be formed to fit substantially any baseboard contour and length, as desired.

And a still further object of the invention is to provide an improved baseboard air duct assembly having readily removable front panel sections and snap-on retaining means wherein the joints between successive sections and at corner bends are securely sealed by a simplified internal joiner member which also serves as a rigid connector between successive front panel sections.

Other objects and advantages of the invention will become apparent as the description proceeds in accordance with the accompanying drawings illustrating specific embodiments of the invention and in which:

Figure 1 is a perspective view of a baseboard air duct assembly according to the present invention;

Fig. 2 is a view corresponding to Fig. 1 but showing the duct elements in partially disassembled relationship;

Fig. 3 is a perspective view of an improved retainer clip according to the invention:

Fig. 4 is a perspective view in fragmentary form of a section of the duct showing the mode of applying the front section onto the retaining clip the first position for mounting the front section being shown in dotted outline;

Fig. 5 is a view corresponding to the view of Fig. 4 but disclosing a different embodiment of the invention in which dual air discharge slots are provided;

Fig. 6 is a corresponding view showing another embodiment of the invention providing three air discharge slots; and Fig. 7 is an end view of a joiner strip according to the invention for connecting and sealing the joint between back wall sections of a duct.

Because of the need for skilled work in assembling air duct units of the ordinary type heretofore available, these units have been a major factor in the expense of a baseboard heating and ventilating system. By providing separately formed back and front sections for the duct, as well as improved spring clip means for holding the back and front sections in properly spaced relation to define a slot or channel therebetween, I have found it possible to construct a duct which is satisfactory in every way and which can be manufactured and installed at greatly reduced cost.

Referring to Figs. 1 and 2, a duct assembly 10, according to my invention, is shown comprising a plurality of substantially L-shaped back sections 12 including an elongate upright panel 14 having a rectilinear horizontally extending top flange 16 integrally formed therewith along the upper marginal edge, a preferably slightly inwardly-turned depending flange 18 formed integrally with the flange 16, and a bottom and forwardly extending leg 20 having formed along its outer edge a downwardly turned bead or catch formation 22. A plurality of front sections 24 are provided, each having a substantially arcuate configuration of buttress-like appearance and of a height corresponding to the height of the back panel 12, a continuous depending flange 26 extending along the top marginal edge of the section and projecting rearwardly therefrom, and a rearwardly projecting foot 28 provided with an upwardly turned bead 30 along its outer edge adapted to engage behind the bead 22 of the leg 20 of the back section in snugly interfitting relationship when the front and back sections are brought together, as shown in Fig. 1.

The flanges 18 and 26 preferably are inclined at a corresponding and substantially parallel angular relationship as seen in Fig. 1 to define therebetween an elongate slot or channel 32 through which the air conditioning medium will be discharged during its travel along the duct assembly 10. The assembly 10 may be constructed to fit around the periphery of any room in accordance with traditional design so that the wall 14 of the back section 12 and the forwardly extending leg 20 thereof will lie against the wall and floor respectively of the room to be secured in place by any suitable means, not shown.

The back section 12 and forward section 24 of the assembly 10 are maintained with their flanges 18 and 26, respectively, in the aforementioned channel defining and parallel relationship by means of a plurality of individual spring clip members 38, each having a contour formation which is complementary to the inner surfaces of the front and back sections respectively.

As seen more particularly in Fig. 3, each spring clip 38 comprises a front portion or leg 40 having a lengthwise configuration which is complementary to the inner surface of the front duct section 24 along its upper portion, a substantially straight back leg 42, and a base portion 44 with which the front and back portions 40 and 42 are integrally formed to provide a three sided member the opposite legs of which coact to product a spring-like action.

As shown in Fig. 3, the front leg 40 has a downwardly turned and rounded free end 46 which is adapted to engage beneath the top flange 26 of the front duct section 24 as will hereinafter be further described; and the rear leg 42 likewise has a downwardly and inwardly turned end portion 48 adapted to be received in the channel 50 defined by the rear wall 12, the forwardly extending horizontal flange 16, and the depending rearwardly directed flange 18 of the back section 12.

In the preferred form of the invention as more particularly shown in Fig. 2, internal corner sections 52 and external corner sections 54, comprising the front wall portion of the duct, are provided with individual wall sections of relatively reduced length joined together by brackets welded therebehind, or by other suitable means.

Thus as shown in Fig. 1, a corner 52 having a front panel 56 and a front panel 58, corresponding in overall contour to the straight front panel sections 24, is provided at the internal corner of the room walls and a corner 54 having front walls 60 and 62 is provided at an external corner. In actual use these corners are held in fixed position and in abutting edge-to-edge relationship to the next adjacent front duct section by the individual spring clips 38 shown in Fig. 3, the spring clips being placed beneath the flange 18 on each side of each of the back section corners and engaged by the respective flange portions 26 of the front section corners.

However, it is preferred that the corner sections 52 and 54 be joined to the adjacent full length sections 24, as shown in Fig. 2, by means of a special joiner strip 66 which in essence corresponds in shape to a relatively short length of forward duct section 24, but which may be of less thickness and of a spring metal stock. Accordingly, the joiner strip 66 is disposed with its upper end in spaced relation to the flange 18 of the back duct section, by means of a pair of the spring clips, designated 68 and 70 in Fig. 2, disposed at the outer edges 72 and 74 of the strip 66 respectively, the foot 76 of the joiner strip engaging beneath bead 22 of leg 20 on the back duct section 12. Thus adjacent front duct sections, such as the elongate section 24 and a corner section 54, or a pair of the elongate sections 24, may be secured in the aforementioned abutting relationship by engaging the bottom feet 28 thereof beneath the bead 22 of the corresponding leg 20 of the back section and also in underlying relationship to the foot 76 of the joiner where the front sections overlap therewith. The joiner therefore serves the same function, with respect to securing the end portions of the front sections, as do the spring clips 38 at other and intermediate locations. It also provides a sealing connection between adjoining front duct sections and serves to close and prevent leakage of air through any crack or space which might be present at the abutting vertical edges of the front duct sections.

Because of the inherent resiliency of the sheet metal employed for ducts of this nature, the foot portion 28 of the front wall panel 24, immediately adjacent the foot 76 of the joiner strip 66, will yield downwardly sufficient to accommodate the thickness of the foot 76 while the remaining length of the front panel foot will retain its normal position and engage the bead 22 of the leg 20 to secure the bottom edge of the front panel in its proper assembled relation.

Preferably the section 24 is always disposed in end-to-end abutting relationship with the corner sections 52 and 54 or with an adjoining straight section, and therefore the joiner strip 66 may be made without the inturned foot 76, in which case the straight bottom edge of the joiner strip will merely engage edgewise in the foot 28 of the front duct panels. An advantage of such an arrangement is that the joiner strip need not be directly supported by a spring clip but rather may be engaged endwise into an open end of a front duct section, as shown at 77 in Fig. 2, and wholly retained by the top flange 26 and the bead 30. In such cases the next adjoining front duct member is merely telescoped over the laterally projecting portion of the joiner strip and the joiner strip functions as an internal connector element as well as a joint seal.

Various means of assembling the air duct unit may be utilized, however, it is preferred to first mount and secure all of the back sections in the desired relationship along the base of the room wall and then insert the spring clips 38 into position beneath the flanges 16—18. A clip 38 should be disposed on each side of each corner and sufficient intermediate clips should be used to provide a 12 to 16 inch spacing between clips.

In mounting the clips 38 it is preferred to first engage the rear leg 42 of the clip in locked position with the flanges 16—18 of the rear duct section 12 by forcing the rounded head 48 upwardly after the leg 42 has been placed in abutting parallel contact with the back wall 14. Thus the rounded contour of the upper end 48 will cam against the flange 18 and spring sufficiently to permit the head or end 48 to enter the inverted channel 50 and be resiliently clamped or locked therein with the leg 42 in secure alignment with the back section 12.

In order to provide an orientation means for positioning of the elongate front sections 24, it is desirable first to mount the corner members 52 and 54 in proper relation with corresponding portions of the back section 12, preferably by utilizing the joiners 66 with the clips 38 at all outside corners. The corner members are applied by first engaging the foot portions 28 beneath the bead 22 on the leg 20 of the back section, and then forcing the top flange portions 26 over the rounded free ends 46 of the front legs 40 on the mounting clips. This is easily done because the clips will flex inwardly and downwardly to pass the flanges 26 and then snap upwardly beneath the flanges 26.

Thereupon, as best shown in Fig. 9, the front sections 24 may be secured in position by first engaging the bead 30 of the foot 28 beneath the catch formation 22 as described and then pivoting this section forwardly until its front and forwardly extending flange 26 abuts the curved end of the front leg 40 of the nearest spring clip, this position being indicated in dotted outline. Slight pressure exerted manually on the outer surface of the front section will then serve to cam the forwardly extending flange 26 up and over the curved portion 46 of the leg 40 of the clip, which yields downwardly with springlike action at such time, and thereupon the flange 26 snaps home and locks upon the curved portion 46 whereby this flange is held firmly in the aforementioned spaced relation to flange 18 of the back section 12 by virtue of the horizontal portion 44 of the clip.

As before mentioned, the spring clips 38 are preferably disposed in predetermined spaced-apart relation initially within the channel 50 of the back sections 12, for example 12 to 16 inches apart, and the initial application of the front section, such as section 24 shown in Fig. 2, may be begun at one end thereof and be accomplished progressively toward the other end until the entire section is clamped in position. As stated, these sections may be as long as 12 to 18 feet and since there is no necessity of aligning the individual front sections with preformed apertures, screw openings, or fixed position brackets on the respective back sections, this operation may be completed very rapidly without the requirement of any special skill. All that is necessary is to measure the length of span between corner members and then cut the front panel to the desired length for close end-to-end abutment of the adjoining ends.

Referring now to Fig. 5, a second embodiment of the invention is shown wherein instead of a single elongate slot or air discharge channel 32 as shown in Fig. 1, a plurality of such channels, as at 80 and 82, are formed. The construction of the front and back duct sections corresponds to that shown in Figs. 1 through 4. However, a spring clip 84 is provided which has a substantially sinusoidal central configuration for the free forward end which engages the front panel 24. Thus the back leg 86 of the clip corresponds to the portion 42 of the clip 38 and is provided with a forwardly and downwardly curved upper end portion 88 in the same manner. However, the front leg 90 is provided with a downwardly and rearwardly extending web 92 having a predetermined length and being bent upon itself to form an integral U-shaped extension 94 with an upwardly extending free leg 96. It is preferred that a second reverse bend be provided at the upper extremity of the leg 96 to form a rounded end 98 having a short free leg 99. A substantially U-shaped channel section 100 having a width substantially corresponding to the thickness of the bend 98 at the free end of the leg 96 and extending the entire length of the air discharge slot is then mounted in inverted position on the rounded end portions 98 and is held firmly and frictionally thereby to provide a continuous divider for the space between the flanges 26 and 18 of the front and rear duct sections respectively. Thus the fitting or channel forming section 100 cooperates with the flange 18 and the flange 26 to define the aforementioned channels 80 and 82 so that the air conditioning medium discharged from the duct may be given an increased directionality whereby to augment the circulation of air in the room where the duct is installed.

A third embodiment is shown in Fig. 6 corresponding to the embodiment of Fig. 5 but wherein the spring clip 102 is provided with a second U-shaped extension as a continuation of the formation shown in Fig. 5. Thus the duct sections 12 and 24 again correspond to those shown in Figs. 1 through 4, and the spring clip 102 is constructed so that back leg 104 and its rounded depending flange portion 106 again correspond to the leg 42 and flange 48 shown in Fig. 3. However, the front leg 108, after being turned at 109 to form the catch for the flange 26 on section 24, is provided with a depending rearwardly extending portion 110 having a U-bend 111 at its bottom end joining it integrally with an upwardly-extending leg 112 which is bent sharply upon itself at 113 to provide a depending parallel leg 114 in closely spaced relationship thereto. A second relatively large U-bend 116 is provided at the bottom end of the leg 114 to connect an upstanding parallel leg 118 which is spaced apart from the leg 114 a distance corresponding to the spacing of legs 110 and 112. A short depending extension 119 is joined by a sharp or narrow bend 121 to leg 118, and a pair of elongated inverted U-shaped dividing strips 120 and 122 are mounted on the upper bends 113 and 121 to define three channels 124, 126 and 128 to further augment the directional venting and circulation of air in a chamber containing the duct.

The assembly of the embodiments of Figs. 5 and 6 thus corresponds to that of the first embodiment, wherein the spring clip 38 is used, and the joiner strip 66 may also be utilized to advantage therewith. However, upon completion of the assembly of front section 24 with rear section 12, the channel defining strips 100, 120 and 122 are pressed onto the narrow bent portions of the clips as described to provide continuous dividers lengthwise of the duct discharge opening.

A modified form of joiner strip for sealing the joints between successive back sections of the improved air duct is shown in Fig. 7. In this form the upper end of the joiner strip 66.1 is made with a rounded section or form, as at 78.2, which is like the rear portion 48 of the spring clips 38 and therefore adapted to be sprung into place behind the flanges 16 and 18 of the back section 14 in substantially the same way that the clips 38 are installed, and the body of the joiner is made flat and straight as at 78.1 so as to lie flatly against the surface of the wall of the back sections 14. Also the foot of the vertical portion 78.1 is merely a straight edge and the length of the joiner 66.1 is made such that when the rounded upper end is secured in the channel space beneath the flanges 16 and 18 of the back sections the straight bottom edge will engage in the bead 22.1 which may be formed at the juncture of the leg 20 with the vertical wall 14. The width of these back section joiner strips 66.1 will be substantially the same as the front joiner strips 66, so as to extend about an inch on each side of the joint.

In this manner the back section joiner strips are self secured and function not only as joint seals, but also as rigid connectors which in effect makes the adjoining rear or back sections of the duct a single continuous unit. This is of particular advantage in those instances where the joint between successive back sections of the duct is located between wall studs and is hence unsupported by any well structure.

While it is not so shown in Figs. 1 and 2 it should be understood that the bead 22.1 is normally provided at the juncture of the wall 14 and foot 20 of the duct back sections 12, as shown in Figs. 4, 5 and 6, in order to conform with the bead 22 along the front edge of the foot 20. Hence the channel to receive the straight bottom edge of the back section joiner strip 66.1 will ordinarily be available.

In disassembling the duct, it is merely required that a screw driver or other suitable prying tool be inserted into the duct discharge opening, between the successive spring clips, and then forced upwardly and outwardly against the flange 26 of the front section 24 using the flange 18 as a fulcrum to spring the front section over and off the holding portions of the spring clips. When the joiner strips are used, the front sections will be disengaged from both the clips and the joiners, since the joiners will flex with the clips, and then if desired the joiners may be removed by sliding them sidewise off the clips.

Accordingly, there has been provided a duct which is economical to manufacture and simple in construction, and which may be assembled by simply snapping the front sections onto the simple spring clips carried by the back section. The improved clamping action provided by the spring form of the clips permits the easy camming of the front section onto complementary contours thereof and at the same time the proved clip construction provides a rigid spacer which holds the front section firmly against movement in both the inward and outward directions so that a rigid duct assembly is had without the use of screws, bolts or fixed position mounting brackets.

Although I have herein set forth and described my invention with respect to certain specific embodiments thereof, it will be understood that numerous details may be altered or omitted without departing from the spirit and scope of the invention as set forth in the following claims:

I claim:

1. A baseboard duct assembly comprising a rear section having an inverted channel formation at its upper marginal edge extending the length of the section on the forward side thereof, a front section having a rearwardly and downwardly extending flange along its upper marginal edge adapted to be disposed in parallel spaced relation with the channel formation on said back section to define a venting slot therebetween, and a spring clip for securing the upper edge of said front section in said spaced relation with said back section; said clip including a vertical back leg having a forwardly rounded resilient holding element at the upper end thereof adapted to be frictionally engaged within said channel by resilient upward movement thereinto, a rigid base portion projecting forwardly from the lower portion of said back leg, and a front leg projecting upwardly from said base portion and having a rearwardly rounded upper end adapted to engage resiliently beneath the flange of said front section when said flange is forcibly cammed thereover; said duct assembly including means for holding the lower marginal edge of said front section in fixed forwardly spaced relation with the lower marginal edge of said rear section.

2. A baseboard duct assembly comprising a rear section including an upright wall and a leg extending forwardly from the lower portion of said wall, said upright wall including a forwardly extending flange formed integrally along the upper marginal edge thereof and a depending flange formed integrally with the forward edge of the first-named flange, said upright wall and said flanges defining an elongate downwardly opening channel therebetween, a front section having a rearwardly and downwardly projecting flang extending along its upper margin adapted to be disposed in predetermined spaced relation to said second-named flange of said back section to define a venting slot therebetween, said front section having a foot portion extending along its lower margin for engagement with the free end of said forwardly extending leg of said back section, and a spring clip for securing the upper margin of said front section in said spaced relation with said back section; said clip comprising a vertical back leg having a forwardly and downwardly turned portion at its upper end adapted to be resiliently engaged within said channel, a base portion projecting forwardly from the lower end of said back leg, and a front leg extending upwardly from the forward end of said base portion and having a rearwardly and downwardly turned upper end portion adapted to be received resiliently behind the flange on said front section when said flange is forcibly cammed thereover.

3. A baseboard duct assembly comprising an elongate L-shaped rear section having a forwardly projecting inverted channel formation extending along its upper margin and a forwardly projecting leg at its bottom margin, a plurality of front sections each having a rearwardly and downwardly projecting flange extending along its upper edge, said front sections being adapted to be disposed end-to-end in parallel forwardly spaced relation with said back section to define an elongate upwardly directed venting slot therebetween, said front sections each having a rearwardly projecting foot extending along its bottom edge and an upwardly projecting formation on said foot for hooking engagement beneath the forward edge of the rear section leg, said leg having complementary means adjacent its forward edge for hooking engagement by the formation on said foot; a spring clip of substantially U-shape for securing the upper margin of said front section in said spaced relation with said back section, said clip including a vertical back leg bearing against said rear section and having a forwardly and downwardly turned portion at its upper end resiliently received vertically within said channel and an upwardly projecting front leg having a rearwardly and downwardly turned portion at its upper end resiliently hooked beneath said front section flange; and a joiner strip having a vertical cross-sectional contour complementary to the vertical inner surface contour of said front sections and flanges, said strip being disposed against the inner surfaces of adjacent pairs of said front sections in interfitting relation with the flanges thereof and in overlapping relationship with adjoining ends thereof, said strip being of a length to engage vertically against the feet of the adjoining front panel sections whereby to seal the joint therebetween.

4. An air duct wall panel assembly clip comprising a substantially U-shaped member of resilient material having a pair of spaced upright legs and a connecting base portion integrally formed therewith, each of said legs having an inwardly and downwardly curved formation at its upper end, one of said legs being substantially at right angles with said base portion, and the other of said legs being generally inclined inwardly toward said one leg and relative to said base portion.

5. An air duct wall panel assembly clip comprising a unitary generally U-shaped element having a pair of upright legs and a flat base portion connecting said legs, each of said legs having an inwardly and downwardly curved portion at the upper end thereof, one of said legs being longer than the other leg and disposed at substantially right angles with said flat base portion.

6. The construction according to claim 5 wherein the shorter one of said legs has an inwardly curved arcuate configuration in the vertical direction.

7. A baseboard duct assembly comprising an elongate rear section including an upright wall and a leg extending forwardly from the bottom end of said wall, said upright wall including a forwardly extending flange formed integrally along the upper marginal edge thereof and a depending rearwardly inclined flange formed integrally with the free margin of the first-named flange, said upright wall and said flanges defining an elongate channel having a restricted opening facing said leg, a front section extending parallel with said rear section and having a rearwardly and downwardly projecting flange extending along its upper margin in parallel spaced relation with said second-named flange on said back section to define a venting slot therebetween, said front section having a foot portion at its lower margin engaged beneath the free margin of said forwardly extending leg of said back section, and a substantially U-shaped resilient clip member securing the upper margin of said front section in fixed parallel relation with the flanges of said back section; said clip member comprising a vertical back leg engaging the wall of said rear section and terminating at its upper end in a forwardly and downwardly curved head portion adapted to be resiliently received within said channel by forcible upward movement thereto and a front leg having a rearwardly turned portion at its upper end engaged behind said flange on said front section, and said clip member having a flat substantially rigid base connecting its said legs; the forwardly extending leg of said back section having a bead formation extending along the front edge of the leg, and the foot of said front section having a longitudinally extending bead engaged beneath and behind the bead of said forwardly extending leg.

8. A baseboard duct assembly comprising an elongate rear section having an inverted channel formation at its upper marginal edge extending the length of the section on the forward side thereof, a front section disposed parallel with the rear section and having a rearwardly and downwardly extending flange along its upper marginal edge disposed in parallel spaced relation with the channel formation on said back section to define a venting slot therebetween, and a spring clip for securing the upper margin of said front section in said parallel relation with said back section; said clip including a vertical back leg having a forwardly rounded holding element at the upper end thereof frictionally engaged within said channel by resilient upward movement thereinto, a rigid base portion projecting forwardly from the lower portion of said back leg, and a front leg projecting upwardly from said base portion and having a rearwardly rounded upper end engaged resiliently beneath the flange of said front section; a divider member disposed in said venting slot and extending lengthwise thereof, means on said spring clip connected with the front leg thereof for supporting said divider member in spaced relation with the venting slot defining portions of said front and rear sections, and means for holding the lower margin of the front section in fixed spaced parallel relation with said rear section.

9. An air duct wall panel assembly clip comprising a substantially U-shaped member having a pair of legs extending upwardly from a straight transverse base portion, one of said legs being at right angles to said base portion and terminating at its upper end in an inwardly and downwardly curved radially resilient loop, the other of said legs terminating in a vertically rounded portion formed by an inwardly turned substantially reverse bend forming a downwardly projecting first intermediate leg, said first intermediate leg being turned upon itself to form an upwardly projecting second intermediate leg, and said second intermediate leg being turned upon itself at its upper end to form a terminal portion disposed substantially at the same height above said base as the rounded portion terminating said one leg of the said U-shaped member.

10. In a baseboard air duct assembly comprising separable elongated parallel front and rear duct wall sections interlockingly connected together along their bottom edges and terminating at their upper edges in inwardly and downwardly turned flange portions disposed in spaced relation with each other and defining an air venting slot extending lengthwise of the assembly, said front section comprising a plurality of separate units disposed end-to-end lengthwise of the air duct, and the downwardly turned flange of the rear section being inclined toward the rear thereof, the combination of a plurality of unitary substantially U-shaped spring clips spaced longitudinally of the duct and disposed transversely of said slot, said clips having inwardly turned rounded terminal portions on the upper ends of their rear and front legs resiliently engaged respectively behind the inclined flange of the rear section and beneath the flange of the front sections to hold the said front and rear sections in fixed parallel spaced relation with each other, and a joiner member disposed behind and overlapping the adjoining ends of each pair of front section units in face to face contact therewith, said joiner member comprising a relatively narrow vertically extending strip having substantially the same vertical sectional contour as the said front wall section, said joiner member being engaged by its upper end beneath the front section flange and extending downwardly therefrom against the inner surface of said front section and into endwise engagement with the bottom of the duct, and means at the bottom of the duct adjacent the inner surface of the front wall section for retaining said joiner member thereagainst.

11. An air duct assembly comprising a plurality of elongate back sections arranged end to end, each of said back sections having a vertical rear wall terminating at its upper edge in an inverted longitudinally extending channel formed by a forwardly projecting flange and a depending rearwardly inclined flange integral on the free margin of the first named flange, said back sections each having a forwardly projecting leg at the bottom edge of said wall and an upwardly opening longitudinally extending groove at the juncture of said leg and wall, a plurality of elongate front sections arranged end to end in spaced parallel relation with said back sections, said front sections each having a longitudinally extending rearwardly projecting foot on its bottom edge for engaging the forward margin of a back section leg and a rearwardly and downwardly projecting flange extending along its upper margin in spaced relation with the second named flange on the said back sections, a plurality of resilient clip members spaced apart longitudinally of said front and back sections and each having upwardly extending front and rear legs engaged respectively beneath the flanges of said front and back sections for holding the upper margins of said sections in parallel spaced relation with each other, and a relatively narrow vertical extending joiner strip overlying the joint between the adjoining ends of said back sections on the forward face thereof for sealing said joint and connecting successive back sections together, said joiner strip comprising a flat vertical wall portion of resilient material terminating at its upper end in a forwardly rolled spring portion for resilient engagement in the said inverted channel of the said back sections, said wall portion of the joiner strip having its bottom end seated in the groove at the juncture of the back section leg and wall when the said spring portion is resiliently engaged in said back section channel.

References Cited in the file of this patent
UNITED STATES PATENTS

| 2,487,287 | Weber | Nov. 8, 1949 |
| 2,796,016 | De Roo | June 18, 1957 |
| 2,800,069 | Smith | July 23, 1957 |